US012456473B2

(12) United States Patent
Kjoerling et al.

(10) Patent No.: US 12,456,473 B2
(45) Date of Patent: *Oct. 28, 2025

(54) AUDIO ENCODER AND DECODER FOR INTERLEAVED WAVEFORM CODING

(71) Applicant: DOLBY INTERNATIONAL AB, Dublin (IE)

(72) Inventors: Kristofer Kjoerling, Solna (SE); Robin Thesing, Nuremberg (DE); Harald Mundt, Sundbyberg (SE); Heiko Jonas Purnhagen, Sundbyberg (SE); Karl Jonas Roeden, Solna (SE)

(73) Assignee: DOLBY INTERNTIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/539,664

(22) Filed: Dec. 14, 2023

(65) Prior Publication Data

US 2024/0194210 A1 Jun. 13, 2024

Related U.S. Application Data

(63) Continuation of application No. 17/495,184, filed on Oct. 6, 2021, now Pat. No. 11,875,805, which is a (Continued)

(51) Int. Cl.
*G10L 19/00* (2013.01)
*G10L 19/02* (2013.01)
(Continued)

(52) U.S. Cl.
CPC .......... *G10L 19/0208* (2013.01); *G10L 19/02* (2013.01); *G10L 19/0212* (2013.01);
(Continued)

(58) Field of Classification Search
CPC ................................ G10L 19/00; G10L 19/02
See application file for complete search history.

(56) References Cited

U.S. PATENT DOCUMENTS 5,280,561 A 1/1994 Satoh
5,581,618 A 12/1996 Satoshi
(Continued)

FOREIGN PATENT DOCUMENTS

CN 1177433 C 10/2003
CN 1947174 4/2007
(Continued)

OTHER PUBLICATIONS

Nader, Charles, et al. "Harmonic sampling and reconstruction of wideband undersampled waveforms: Breaking the code." IEEE transactions on microwave theory and techniques 59.11 (2011): 2961-2969. (Year: 2011).*

(Continued)

*Primary Examiner* — Jialong He

(57) ABSTRACT

There is provided methods and apparatuses for decoding and encoding of audio signals. In particular, a method for decoding includes receiving a waveform-coded signal having a spectral content corresponding to a subset of the frequency range above a cross-over frequency. The waveform-coded signal is interleaved with a parametric high frequency reconstruction of the audio signal above the cross-over frequency. In this way an improved reconstruction of the high frequency bands of the audio signal is achieved.

7 Claims, 8 Drawing Sheets

Related U.S. Application Data continuation of application No. 16/169,964, filed on Oct. 24, 2018, now Pat. No. 11,145,318, which is a continuation of application No. 15/279,365, filed on Sep. 28, 2016, now Pat. No. 10,121,479, which is a continuation of application No. 14/781,891, filed as application No. PCT/EP2014/056856 on Apr. 4, 2014, now Pat. No. 9,514,761.

(60) Provisional application No. 61/808,687, filed on Apr. 5, 2013.

(51) Int. Cl.
*G10L 19/26* (2013.01)
*G10L 21/038* (2013.01)
*G10L 21/0388* (2013.01)

(52) U.S. Cl.
CPC ............ *G10L 19/26* (2013.01); *G10L 21/038* (2013.01); *G10L 21/0388* (2013.01)

(56) References Cited

U.S. PATENT DOCUMENTS

| | | | |
|---|---|---|---|
| 5,598,478 | A | 1/1997 | Tanaka |
| 5,796,843 | A | 8/1998 | Inanaga |
| 5,970,443 | A | 10/1999 | Fujii |
| 6,442,275 | B1 | 8/2002 | Diethorn |
| 7,191,136 | B2 | 3/2007 | Sinha et al. |
| 7,519,538 | B2 | 4/2009 | Villemoes |
| 7,668,722 | B2 | 2/2010 | Lars |
| 7,684,981 | B2 | 3/2010 | Thumpudi |
| 7,693,709 | B2 | 4/2010 | Thumpudi |
| 8,015,368 | B2 | 9/2011 | Sharma |
| 8,046,214 | B2 | 10/2011 | Mehrotra |
| 8,190,425 | B2 | 5/2012 | Mehrotra et al. |
| 8,194,754 | B2 | 6/2012 | Oh |
| 8,199,827 | B2 | 6/2012 | Oh |
| 8,199,828 | B2 | 6/2012 | Oh |
| 8,255,231 | B2 | 8/2012 | Falck |
| 8,363,842 | B2 | 1/2013 | Chisato |
| 2002/0103637 | A1 | 8/2002 | Henn |
| 2004/0225505 | A1 | 11/2004 | Andersen et al. |
| 2005/0047624 | A1 | 3/2005 | Kleen |
| 2005/0096917 | A1 | 5/2005 | Kristofer |
| 2006/0031075 | A1 | 2/2006 | Oh |
| 2008/0259014 | A1 | 10/2008 | Inoue |
| 2008/0260048 | A1 | 10/2008 | Oomen et al. |
| 2008/0270124 | A1 | 10/2008 | Son et al. |
| 2008/0319739 | A1 | 12/2008 | Mehrotra |
| 2009/0132261 | A1 | 5/2009 | Kristofer |
| 2010/0023322 | A1 | 1/2010 | Schnell |
| 2010/0063802 | A1 | 3/2010 | Gao |
| 2010/0223052 | A1 | 9/2010 | Nilsson |
| 2010/0262420 | A1 | 10/2010 | Herre |
| 2011/0019838 | A1 | 1/2011 | Kaulberg |
| 2011/0099018 | A1 | 4/2011 | Neuendorf et al. |
| 2011/0202352 | A1 | 8/2011 | Neuendorf |
| 2011/0202355 | A1 | 8/2011 | Grill et al. |
| 2011/0264454 | A1 | 10/2011 | Ullberg |
| 2011/0288873 | A1 | 11/2011 | Nagel |
| 2012/0022676 | A1 | 1/2012 | Ishikawa |
| 2012/0065983 | A1 | 3/2012 | Ekstrand |
| 2012/0078640 | A1 | 3/2012 | Shirakawa |
| 2012/0201388 | A1 | 8/2012 | Seo |
| 2012/0243526 | A1 | 9/2012 | Yamamoto |
| 2012/0275607 | A1 | 11/2012 | Kristofer |
| 2012/0328124 | A1 | 12/2012 | Kristofer |
| 2013/0090929 | A1 | 4/2013 | Ishikawa et al. |
| 2013/0096912 | A1 | 4/2013 | Resch |
| 2013/0226597 | A1 | 8/2013 | Kristofer |
| 2014/0088973 | A1 | 3/2014 | Gibbs |
| 2015/0003632 | A1 | 1/2015 | Thesing |

FOREIGN PATENT DOCUMENTS

| | | | |
|---|---|---|---|
| CN | 101048935 | B | 10/2007 |
| CN | 101086845 | B | 12/2007 |
| CN | 101129090 | B | 2/2008 |
| CN | 101236745 | | 8/2008 |
| CN | 102089758 | B | 6/2011 |
| CN | 102089814 | | 6/2011 |
| CN | 102177545 | B | 9/2011 |
| CN | 102246231 | | 11/2011 |
| CN | 102598121 | B | 7/2012 |
| CN | 102089814 | B | 11/2012 |
| CN | 103000177 | B | 3/2013 |
| CN | 1682567 | B | 6/2014 |
| CN | 104869335 | B | 8/2015 |
| DE | 10338694 | B4 | 3/2005 |
| EP | 1035732 | A1 | 9/2000 |
| EP | 1158494 | | 11/2001 |
| EP | 1919259 | A2 | 5/2008 |
| EP | 2104096 | B1 | 9/2009 |
| JP | 2008033211 | A | 2/2008 |
| JP | 2008-096567 | | 4/2008 |
| JP | 2008-139844 | | 6/2008 |
| JP | 2009069446 | A | 4/2009 |
| JP | 2010041579 | A | 2/2010 |
| JP | 2013-125187 | | 6/2013 |
| JP | 6859394 | | 4/2021 |
| KR | 10-2007-0118173 | | 12/2007 |
| KR | 10-2007-0119722 | | 12/2007 |
| KR | 20110040828 | A | 4/2011 |
| RU | 2335809 | C2 | 10/2008 |
| RU | 2470384 | | 12/2012 |
| WO | 2003/046891 | | 6/2003 |
| WO | 2008/084688 | | 7/2008 |
| WO | 2012/158333 | | 11/2012 |

OTHER PUBLICATIONS

Bartkowiak, Maciej. "Low bit rate coding of sparse audio spectra using frequency shift and interleaved MDCT." 2007 15th European Signal Processing Conference. IEEE, 2007. (Year: 2007).*
Neuendorf, Max, et al. "The ISO/MPEG unified speech and audio coding standard—consistent high quality for all content types and at all bit rates." Journal of the Audio Engineering Society 61.12 (2013): 956-977. (Year: 2013).*
A.C. Den Brinker et al. "An Overview of the Coding Standard MPEG-4 Audio Amendments 1 and 2: HE-AAC, SSC and HE-AAC v2" EURASIP Journal on Audio, Speech, and Music Processing, vol. 2009.
Ehret, A. et al."aacPlus, Only a Low-Bitrate Codec?" AES 117 Convention, Oct. 2004.
Ekstrand, Per, "Bandwidth Extension of Audio Signals by Spectral Band Replication" Proc 1st IEEE Benelux Workshop on Model Based Processing and Coding of Audio, Leuven, Belgium, Nov. 15, 2002.
Geiser, B. et al."Bandwidth Extension for Hierarchical Speech and Audio Coding in ITU-T Rec. G.729-1" IEEE Transactions on Audio, Speech, and Language Processing, vol. 15, No. 8, Nov. 2007, pp. 2496-2509.
Kim et al "Quality Improvement Using a Sinusoidal Model in HE-AAC", AES 123rd Convention, New York, NY, USA Oct. 1, 2007.
Kovesi, B. et al."A Scalable Speech and Audio Coding Scheme with Continuous Bitrate Flexibility" IEEE International Conference on Acoustics, Speech, and Signal Processing, vol. 1, May 17, 2004, pp. 273-276.
Liu Dong-Bing, et al."Overview of Spectral Band Replication in Audio Coding" Digital Engineering Center, Communication University of China, Beijing, Dec. 2011.
Nagel, F. et al."A Harmonic Bandwidth Extension Method for Audio Codecs" ICASSP 2009, pp. 145-148.
Ragot, S. et al."ITU-T G.729.1: An 8-32 KBIT/S Scalable Coder Interoperable with G.729 for Wideband Telephony and Voice Over IP" IEEE International Conference on Acoustics, Speech, and Signal Processing, Apr. 15-20, 2007, Honolulu, HI, USA.

(56) References Cited

OTHER PUBLICATIONS

Zernicki, T. et al."Improved Coding of Tonal Components in Audio Techniques Utilizing the SBR Tool" MPEG Meeting ISO/IEC JTC1/SC29/WG11, Coding of Moving Pictures and Audio, Jul. 22, 2010, Geneva, Switzerland.

* cited by examiner

AUDIO ENCODER AND DECODER FOR INTERLEAVED WAVEFORM CODING

CROSS-REFERENCE TO RELATED APPLICATIONS

The present application is a continuation of U.S. patent application Ser. No. 17/495,184 filed Oct. 6, 2021, which is U.S. patent application Ser. No. 16/169,964 filed Oct. 24, 2018, which is a continuation of U.S. patent application Ser. No. 15/279,365 filed Sep. 28, 2016, now U.S. Pat. No. 10,121,479 issued Nov. 6, 2018, which is a continuation of U.S. patent application Ser. No. 14/781,891 filed Oct. 1, 2015, now U.S. Pat. No. 9,514,761 issued Dec. 6, 2016, which is the U.S. national stage of International Patent Application No. PCT/EP2014/056856 filed Apr. 4, 2014, which claims priority to U.S. Provisional Patent Application No. 61/808,687 filed Apr. 5, 2013, all of which are incorporated herein by reference in their entirety.

TECHNICAL FIELD OF THE INVENTION

The invention disclosed herein generally relates to audio encoding and decoding. In particular, it relates to an audio encoder and an audio decoder adapted to perform high frequency reconstruction of audio signals.

BACKGROUND OF THE INVENTION

Audio coding systems use different methodologies for coding of audio, such as pure waveform coding, parametric spatial coding, and high frequency reconstruction algorithms including the Spectral Band Replication (SBR) algorithm. The MPEG-4 standard combines waveform coding and SBR of audio signals. More precisely, an encoder may waveform code an audio signal for spectral bands up to a cross-over frequency and encode the spectral bands above the cross-over frequency using SBR encoding. The waveform-coded part of the audio signal is then transmitted to a decoder together with SBR parameters determined during the SBR encoding. Based on the waveform-coded part of the audio signal and the SBR parameters, the decoder then reconstructs the audio signal in the spectral bands above the cross-over frequency as discussed in the review paper Brinker et al., An overview of the Coding Standard MPEG-4 Audio Amendments 1 and 2: HE-AAC, SSC, and HE-AAC v2, *EURASIP Journal on Audio, Speech, and Music Processing*, Volume 2009, Article ID 468971.

One problem with this approach is that strong tonal components, i.e. strong harmonic components, or any component in the high spectral bands that is not nicely reconstructed by the SBR algorithm will be missing in the output.

To this end, the SBR algorithm implements a missing harmonics detection procedure. Tonal components that will not be properly regenerated by the SBR high frequency reconstruction are identified at the encoder side. Information of the frequency location of these strong tonal components is transmitted to the decoder where the spectral contents in the spectral bands where the missing tonal components are located are replaced by sinusoids generated in the decoder.

An advantage of the missing harmonics detection provided for in the SBR algorithm is that it is a very low bitrate solution since, somewhat simplified, only the frequency location of the tonal component and its amplitude level needs to be transmitted to the decoder.

A drawback of the missing harmonics detection of the SBR algorithm is that it is a very rough model. Another drawback is that when the transmission rate is low, i.e. when the number of bits that may be transmitted per second is low, and as a consequence thereof the spectral bands are wide, a large frequency range will be replaced by a sinusoid.

Another drawback of the SBR algorithm is that it has a tendency to smear out transients occurring in the audio signal. Typically, there will be a pre-echo and a post-echo of the transient in the SBR reconstructed audio signal. There is thus room for improvements.

BRIEF DESCRIPTION OF THE DRAWINGS

In what follows, example embodiments will be described in greater detail and with reference to the accompanying drawings, on which.

All the figures are schematic and generally only show parts which are necessary in order to elucidate the invention, whereas other parts may be omitted or merely suggested. Unless otherwise indicated, like reference numerals refer to like parts in different figures.

DETAILED DESCRIPTION OF THE INVENTION

Figure 1:
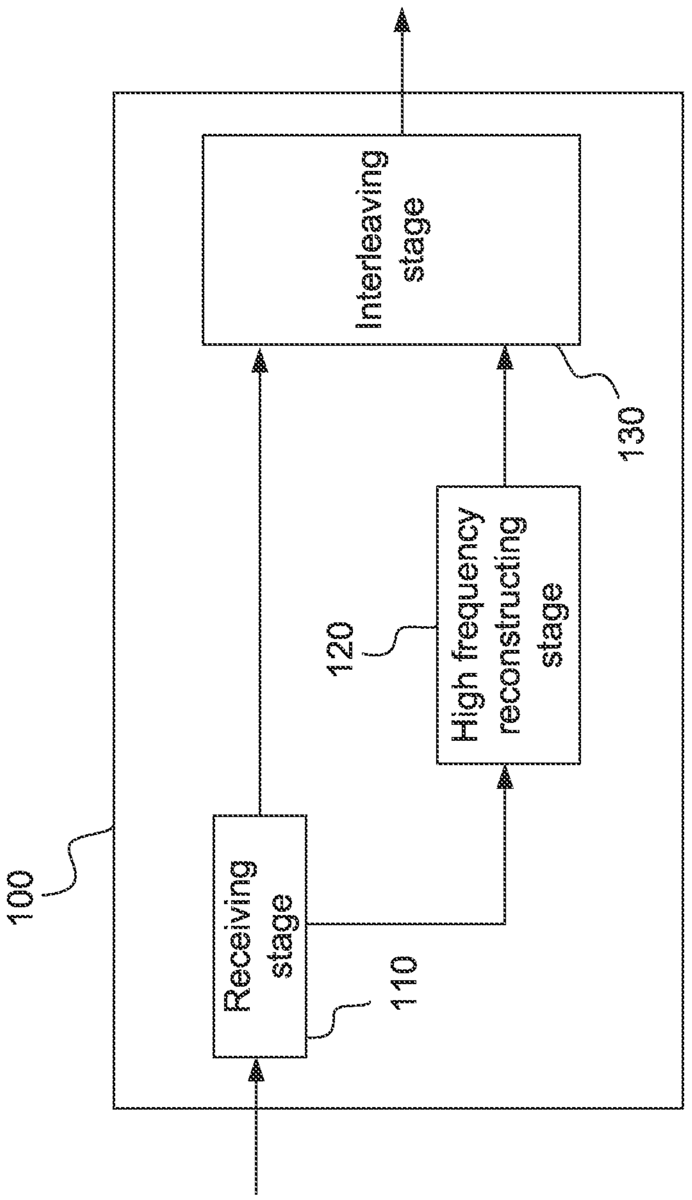
FIG. 1 is a schematic drawing of a decoder according to example embodiments.

In view of the above it is an object to provide an encoder and a decoder and associated methods which provides an improved reconstruction of transients and tonal components in the high frequency bands.

I. Overview—Decoder

As used herein, an audio signal may be a pure audio signal, an audio part of an audiovisual signal or multimedia signal or any of these in combination with metadata.

According to a first aspect, example embodiments propose decoding methods, decoding devices, and computer program products for decoding. The proposed methods, devices and computer program products may generally have the same features and advantages.

According to example embodiments there is provided a decoding method in an audio processing system comprising: receiving a first waveform-coded signal having a spectral content up to a first cross-over frequency; receiving a second waveform-coded signal having a spectral content corresponding to a subset of the frequency range above the first cross-over frequency; receiving high frequency reconstruction parameters; performing high frequency reconstruction using the first waveform-coded signal and the high frequency reconstruction parameters so as to generate a frequency extended signal having a spectral content above the first cross-over frequency; and interleaving the frequency extended signal with the second waveform-coded signal.

As used herein, a waveform-coded signal is to be interpreted as a signal that has been coded by direct quantization of a representation of the waveform; most preferred a quantization of the lines of a frequency transform of the input waveform signal. This is opposed to a parametric coding, where the signal is represented by variations of a generic model of a signal attribute.

The decoding method thus suggests to use waveform-coded data in a subset of the of the frequency range above the first cross-over frequency and to interleave that with a high frequency reconstructed signal. In this way, important parts of a signal in the frequency band above the first cross-over frequency, such as tonal components or transients which are typically not well reconstructed by parametric high frequency reconstruction algorithms, may be waveform-coded. As a result, the reconstruction of these important parts of a signal in the frequency band above the first cross-over frequency is improved.

According to exemplary embodiments, the subset of the frequency range above the first cross-over frequency is a sparse subset. For example it may comprise a plurality of isolated frequency intervals. This is advantageous in that the number of bits to code the second waveform-coded signal is low. Still, by having a plurality of isolated frequency intervals tonal components, e.g. single harmonics, of the audio signal may be well captured by the second waveform-coded signal. As a result, an improvement of the reconstruction of tonal components for high frequency bands is achieved at a low bit cost.

As used herein, a missing harmonics or a single harmonics means any arbitrary strong tonal part of the spectrum. In particular, it is to be understood that a missing harmonics or a single harmonics is not limited to a harmonics of a harmonic series.

According to exemplary embodiments, the second waveform-coded signal may represent a transient in the audio signal to be reconstructed. A transient is typically limited to a short temporal range, such as approximately hundred temporal samples at a sampling rate of 48 kHz, e.g. a temporal range in the order of 5 to 10 milliseconds, but may have a wide frequency range. To capture the transient, the subset of the frequency range above the first cross-over frequency may therefore comprise a frequency interval extending between the first cross-over frequency and a second cross-over frequency. This is advantageous in that an improved reconstruction of transients may be achieved.

According to exemplary embodiments, the second cross-over frequency varies as a function of time. For example, the second cross-over frequency may vary within a time frame set by the audio processing system. In this way, the short temporal range of transients may be accounted for.

According to exemplary embodiments, the step of performing high frequency reconstruction comprises performing spectral band replication, SBR. High frequency reconstruction is typically performed in a frequency domain, such as a pseudo Quadrature Mirror Filters, QMF, domain of e.g. 64 sub-bands.

According to exemplary embodiments, the step of interleaving the frequency extended signal with the second waveform-coded signal is performed in a frequency domain, such as a QMF, domain. Typically, for ease of implementation and better control over the time- and frequency-characteristics of the two signals, the interleaving is performed in the same frequency domain as the high frequency reconstruction.

According to exemplary embodiments, the first and the second waveform-coded signal as received are coded using the same Modified Discrete Cosine Transform, MDCT.

According to exemplary embodiments, the decoding method may comprise adjusting the spectral content of the frequency extended signal in accordance with the high frequency reconstruction parameters so as to adjust the spectral envelope of the frequency extended signal.

According to exemplary embodiments, the interleaving may comprise adding the second waveform-coded signal to the frequency extended signal. This is the preferred option if the second waveform-coded signal represents tonal components, such as when the subset of the frequency range above the first cross-over frequency comprises a plurality of isolated frequency intervals. Adding the second waveform-coded signal to the frequency extended signal mimics the parametric addition of harmonics as known from SBR, and allows the SBR copy-up signal to be used to avoid large frequency ranges to be replaced by a single tonal component by mixing it in at a suitable level.

According to exemplary embodiments, the interleaving comprises replacing the spectral content of the frequency extended signal by the spectral content of the second waveform-coded signal in the subset of the frequency range above the first cross-over frequency which corresponds to the spectral content of the second waveform-coded signal. This is the preferred option when the second waveform-coded signal represents a transient, for example when the subset of the frequency range above the first cross-over frequency may therefore comprise a frequency interval extending between the first cross-over frequency and a second cross-over frequency. The replacement is typically only performed for a time range covered by the second waveform-coded signal. In this way, as little as possible may be replaced while still enough to replace a transient and potential time smear present in the frequency extended signal, and the interleaving is thus not limited to a time-segment specified by the SBR envelope time-grid.

According to exemplary embodiments, the first and the second waveform-coded signal may be separate signals, meaning that they have been coded separately. Alternatively, the first waveform-coded signal and the second waveform-coded signal form first and second signal portions of a common, jointly coded signal. The latter alternative is more attractive from an implementation point of view.

According to exemplary embodiments, the decoding method may comprise receiving a control signal comprising data relating to one or more time ranges and one or more frequency ranges above the first cross-over frequency for which the second waveform-coded signal is available, wherein the step of interleaving the frequency extended signal with the second waveform-coded signal is based on the control signal. This is advantageous in that it provides an efficient way of controlling the interleaving.

According to exemplary embodiments, the control signal comprises at least one of a second vector indicating the one or more frequency ranges above the first cross-over frequency for which the second waveform-coded signal is available for interleaving with the frequency extended signal, and a third vector indicating the one or more time ranges for which the second waveform-coded signal is available for interleaving with the frequency extended signal. This is a convenient way of implementing the control signal.

According to exemplary embodiments, the control signal comprises a first vector indicating one or more frequency ranges above the first cross-over frequency to be parametrically reconstructed based on the high frequency reconstruction parameters. In this way, the frequency extended signal may be given precedence over the second waveform-coded signal for certain frequency bands.

According to exemplary embodiments, there is also provided a computer program product comprising a computer-readable medium with instructions for performing any decoding method of the first aspect.

According to exemplary embodiments, there is also provided a decoder for an audio processing system, comprising: a receiving stage configured to receive a first waveform-coded signal having a spectral content up to a first cross-over frequency, a second waveform-coded signal having a spectral content corresponding to a subset of the frequency range above the first cross-over frequency, and high frequency reconstruction parameters; a high frequency reconstructing stage configured to receive the first waveform-decoded signal and the high frequency reconstruction parameters from the receiving stage and to perform high frequency reconstruction using the first waveform-coded signal and the high frequency reconstruction parameters so as to generate a frequency extended signal having a spectral content above the first cross-over frequency; and an interleaving stage configured to receive the frequency extended signal from the high frequency reconstruction stage and the second waveform-coded signal from the receiving stage, and to interleave the frequency extended signal with the second waveform-coded signal.

According to exemplary embodiments, the decoder may be configured to perform any decoding method disclosed herein.

II. Overview—Encoder

According to a second aspect, example embodiments propose encoding methods, encoding devices, and computer program products for encoding. The proposed methods, devices and computer program products may generally have the same features and advantages.

Advantages regarding features and setups as presented in the overview of the decoder above may generally be valid for the corresponding features and setups for the encoder According to example embodiments, there is provided an encoding method in an audio processing system, comprising the steps of: receiving an audio signal to be encoded; calculating, based on the received audio signal, high frequency reconstruction parameters enabling high frequency reconstruction of the received audio signal above the first cross-over frequency; identifying, based on the received audio signal, a subset of the frequency range above the first cross-over frequency for which the spectral content of the received audio signal is to be waveform-coded and subsequently, in a decoder, be interleaved with a high frequency reconstruction of the audio signal; generating a first waveform-coded signal by waveform-coding the received audio signal for spectral bands up to a first cross-over frequency; and a second waveform-coded signal by waveform-coding the received audio signal for spectral bands corresponding to the identified subset of the frequency range above the first cross-over frequency.

According to example embodiments, the subset of the frequency range above the first cross-over frequency may comprise a plurality of isolated frequency intervals.

According to example embodiments, the subset of the frequency range above the first cross-over frequency may comprise a frequency interval extending between the first cross-over frequency and a second cross-over frequency.

According to example embodiments, the second cross-over frequency may vary as a function of time.

According to example embodiments, the high frequency reconstruction parameters are calculated using spectral band replication, SBR, encoding.

According to example embodiments, the encoding method may further comprise adjusting spectral envelope levels comprised in the high frequency reconstruction parameters so as to compensate for addition of a high frequency reconstruction of the received audio signal with the second waveform-coded signal in a decoder. As the second waveform-coded signal is added to a high frequency reconstructed signal in the decoder, the spectral envelope levels of the combined signal is different from the spectral envelope levels of the high frequency reconstructed signal. This change in spectral envelope levels may be accounted for in the encoder, so that the combined signal in the decoder gets a target spectral envelope. By performing the adjustment on the encoder side, the intelligence needed on the decoder side may be reduced, or put differently; the need for defining specific rules in the decoder for how to handle the situation is removed by specific signaling from the encoder to the decoder. This allows for future optimizations of the system by future optimizations of the encoder without having to update potentially widely deployed decoders.

According to example embodiments, the step of adjusting the high frequency reconstruction parameters may comprise: measuring an energy of the second waveform-coded signal; and adjusting the spectral envelope levels, as intended to control the spectral envelope of the High Frequency Reconstructed signal, by subtracting the measured energy of the second waveform-coded signal from the spectral envelope levels for spectral bands corresponding to the spectral contents of the second waveform-coded signal.

According to exemplary embodiments, there is also provided a computer program product comprising a computer-readable medium with instructions for performing any encoding method of the second aspect.

According to example embodiments, there is provided and encoder for an audio processing system, comprising: a receiving stage configured to receive an audio signal to be encoded; a high frequency encoding stage configured to receive the audio signal from the receiving stage and to calculate, based on the received audio signal, high frequency reconstruction parameters enabling high frequency reconstruction of the received audio signal above the first cross-over frequency; an interleave coding detection stage configured to identify, based on the received audio signal, a subset of the frequency range above the first cross-over frequency for which the spectral content of the received audio signal is to be waveform-coded and subsequently, in a decoder, be interleaved with a high frequency reconstruction of the audio signal; and a waveform encoding stage configured to receive the audio signal from the receiving stage and to generate a first waveform-coded signal by waveform-coding the received audio signal for spectral bands up to a first cross-over frequency; and to receive the identified subset of the frequency range above the first cross-over frequency from the interleave coding detection stage and to generate a second waveform-coded signal by waveform-coding the received audio signal for spectral bands corresponding to the received identified subset of the frequency range.

According to example embodiments, the encoder may further comprise an envelope adjusting stage configured to receive the high frequency reconstruction parameters from the high frequency encoding stage and the identified subset of the frequency range above the first cross-over frequency from the interleave coding detection stage, and, based on the received data, to adjust the high frequency reconstruction parameters so as to compensate for the subsequent interleaving of a high frequency reconstruction of the received audio signal with the second waveform coded signal in the decoder.

According to example embodiments, the decoder may be configured to perform any decoding method disclosed herein.

III. Example Embodiments—Decoder

FIG. 1 illustrates an example embodiment of a decoder 100. The decoder comprises a receiving stage 110, a high frequency reconstructing stage 120, and an interleaving stage 130.

Figure 2:
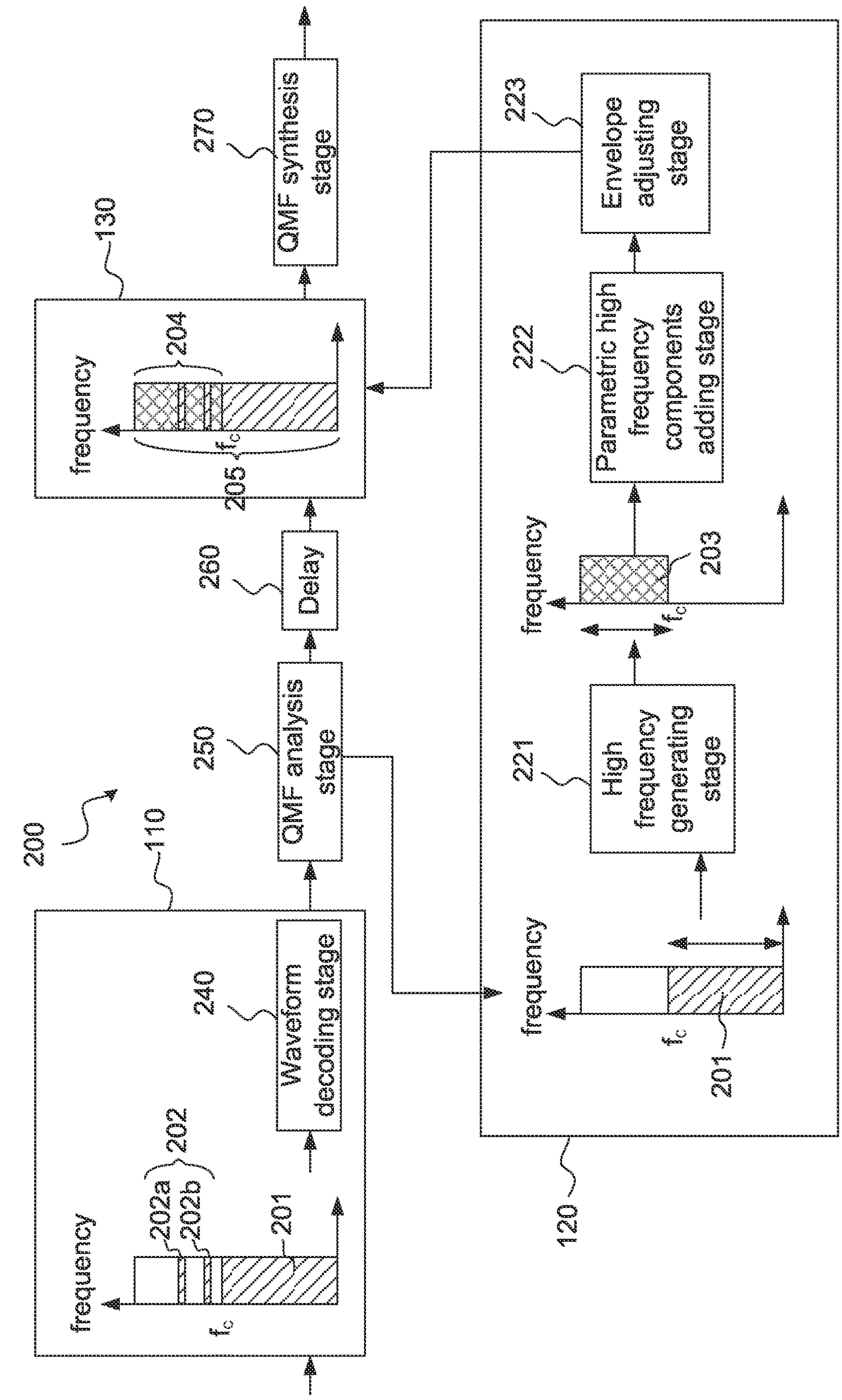
FIG. 2 is a schematic drawing of a decoder according to example embodiments.
Figure 3:
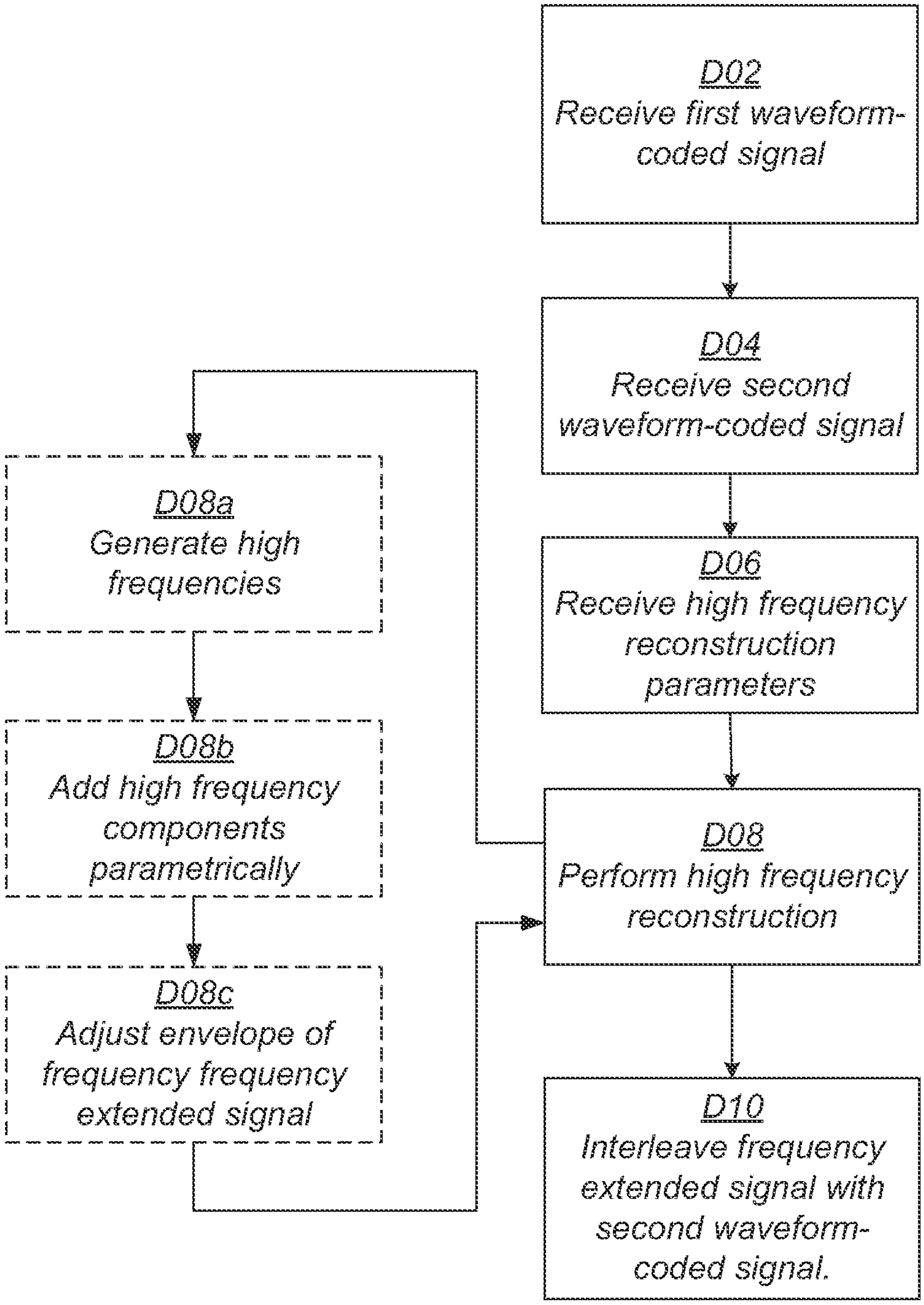
FIG. 3 is a flow chart of a decoding method according to example embodiments.

The operation of the decoder 100 will now be explained in more detail with reference to the example embodiment of FIG. 2, showing a decoder 200, and the flowchart of FIG. 3. The purpose of the decoder 200 is to give an improved signal reconstruction for high frequencies in the case where there are strong tonal components in the high frequency bands of the audio signal to be reconstructed. The receiving stage 110 receives, in step D02, a first waveform-coded signal 201. The first waveform-coded signal 201 has a spectral content up to a first cross-over frequency $f_c$, i.e. the first waveform-coded signal 201 is a low band signal which is limited to the frequency range below the first cross-over frequency $f_c$.

The receiving stage 110 receives, in step D04, a second waveform-coded signal 202. The second waveform-coded signal 202 has a spectral content which corresponds to a subset of the frequency range above the first cross-over frequency $f_c$. In the illustrated example of FIG. 2, the second waveform-coded signal 202 has a spectral content corresponding to a plurality of isolated frequency intervals 202*a* and 202*b*. The second waveform-coded signal 202 may thus be seen to be composed of a plurality of band-limited signals, each band-limited signal corresponding to one of the isolated frequency intervals 202*a* and 202*b*. In FIG. 2 only two frequency intervals 202*a* and 202*b* are shown. Generally, the spectral content of the second waveform-coded signal may correspond to any number of frequency intervals of varying width.

The receiving stage 110 may receive the first and the second waveform-coded signal 201 and 202 as two separate signals. Alternatively, the first and the second waveform-coded signal 201 and 202 may form first and second signal portions of a common signal received by the receiving stage 110. In other words, the first and the second waveform-coded signals may be jointly coded, for example using the same MDCT transform.

Typically, the first waveform-coded signal 201 and the second waveform-coded signal 202 as received by the receiving stage 110 are coded using an overlapping windowed transform, such as a MDCT transform. The receiving stage may comprise a waveform decoding stage 240 configured to transform the first and the second waveform-coded signals 201 and 202 to the time domain. The waveform decoding stage 240 typically comprises a MDCT filter bank configured to perform inverse MDCT transform of the first and the second waveform-coded signal 201 and 202.

The receiving stage 110 further receives, in step D06, high frequency reconstruction parameters which are used by the high frequency reconstruction stage 120 as will be disclosed in the following.

The first waveform-coded signal 201 and the high frequency parameters received by the receiving stage 110 are then input to the high frequency reconstructing stage 120. The high frequency reconstruction stage 120 typically operates on signals in a frequency domain, preferably a QMF domain. Prior to being input to the high frequency reconstruction stage 120, the first waveform-coded signal 201 is therefore preferably transformed into the frequency domain, preferably the QMF domain, by a QMF analysis stage 250. The QMF analysis stage 250 typically comprises a QMF filter bank configured to perform a QMF transform of the first waveform-coded signal 201.

Based on the first waveform-coded signal 201 and the high frequency reconstructing parameters, the high frequency reconstruction stage 120, in step D08, extends the first waveform-coded signal 201 to frequencies above the first cross-over frequency $f_c$. More specifically, the high frequency reconstructing stage 120 generates a frequency extended signal 203 which has a spectral content above the first cross-over frequency $f_c$. The frequency extended signal 203 is thus a high-band signal.

The high frequency reconstructing stage 120 may operate according to any known algorithm for performing high frequency reconstruction. In particular, the high frequency reconstructing stage 120 may be configured to perform SBR as disclosed in the review paper Brinker et al., An overview of the Coding Standard MPEG-4 Audio Amendments 1 and 2: HE-AAC, SSC, and HE-AAC v2*, EURASIP Journal on Audio, Speech, and Music Processing*, Volume 2009, Article ID 468971. As such, the high frequency reconstructing stage may comprise a number of sub-stages configured to generate the frequency extended signal 203 in a number of steps. For example, the high frequency reconstructing stage 120 may comprise a high frequency generating stage 221, a parametric high frequency components adding stage 222, and an envelope adjusting stage 223.

In brief, the high frequency generating stage 221, in a first sub-step D08*a*, extends the first waveform-coded signal 201 to the frequency range above the cross-over frequency $f_c$ in order to generate the frequency extended signal 203. The generation is performed by selecting sub-band portions of the first waveform-coded signal 201 and according to specific rules, guided by the high frequency reconstruction parameters, mirror or copy the selected sub-band portions of the first waveform-coded signal 201 to selected sub-band portions of the frequency range above the first cross-over frequency $f_c$.

The high frequency reconstruction parameters may further comprise missing harmonics parameters for adding missing harmonics to the frequency extended signal 203. As discussed above, a missing harmonics is to be interpreted as any arbitrary strong tonal part of the spectrum. For example, the missing harmonics parameters may comprise parameters relating to the frequency and amplitude of the missing harmonics. Based on the missing harmonics parameters, the parametric high frequency components adding stage 222 generates, in sub-step D08*b*, sinusoid components and adds the sinusoid components to the frequency extended signal 203.

The high frequency reconstruction parameters may further comprise spectral envelope parameters describing the target energy levels of the frequency extended signal 203. Based on the spectral envelope parameters, the envelope adjusting stage 223 may in sub-step D08*c* adjust the spectral content of the frequency extended signal 203, i.e. the spectral coefficients of the frequency extended signal 203, so that the energy levels of the frequency extended signal 203 corresponds to the target energy levels described by the spectral envelope parameters.

The frequency extended signal 203 from the high frequency reconstructing stage 120 and the second waveform-coded signal from the receiving stage 110 are then input to the interleaving stage 130. The interleaving stage 130 typically operates in the same frequency domain, preferably the QMF domain, as the high frequency reconstructing stage 120. Thus, the second waveform-coded signal 202 is typically input to the interleaving stage via the QMF analysis stage 250. Further, the second waveform-coded signal 202 is typically delayed, by a delay stage 260, to compensate for the time it takes for the high frequency reconstructing stage 120 to perform the high frequency reconstruction. In this way, the second wave-form coded signal 202 and the frequency extended signal 203 will be aligned such that the interleaving stage 130 operates on signals corresponding to the same time frame.

The interleaving stage 130, in step D10, then interleaves, i.e., combines the second waveform-coded signal 202 with the frequency extended signal 203 in order to generate an interleaved signal 204. Different approaches may be used to interleave the second waveform-coded signal 202 with the frequency extended signal 203.

According to one example embodiment, the interleaving stage 130 interleaves the frequency extended signal 203 with the second waveform-coded signal 202 by adding the frequency extended signal 203 and the second waveform-coded signal 202. The spectral contents of the second waveform-coded signal 202 overlaps the spectral contents of the frequency extended signal 203 in the subset of the frequency range corresponding to the spectral contents of the second waveform-coded signal 202. By adding the frequency extended signal 203 and the second waveform-coded signal 202 the interleaved signal 204 thus comprises the spectral contents of the frequency extended signal 203 as well as the spectral contents of the second waveform-coded signal 202 for the overlapping frequencies. As a result of the addition, the spectral envelope levels of the interleaved signal 204 increases for the overlapping frequencies. Preferably, and as will be disclosed later, the increase in spectral envelope levels due to the addition is accounted for on the encoder side when determining energy envelope levels comprised in the high frequency reconstruction parameters. For example, the spectral envelope levels for the overlapping frequencies may be decreased on the encoder side by an amount corresponding to the increase in spectral envelope levels due to interleaving on the decoder side.

Alternatively, the increase in spectral envelope levels due to addition may be accounted for on the decoder side. For example, there may be an energy measuring stage which measures the energy of the second waveform-coded signal 202, compares the measured energy to the target energy levels described by the spectral envelope parameters, and adjusts the extended frequency signal 203 such that the spectral envelope levels for the interleaved signal 204 equals the target energy levels.

According to another example embodiment, the interleaving stage 130 interleaves the frequency extended signal 203 with the second waveform-coded signal 202 by replacing the spectral contents of the frequency extended signal 203 by the spectral contents of the second waveform-coded signal 202 for those frequencies where the frequency extended signal 203 and the second waveform-coded signal 202 overlaps. In example embodiments where the frequency extended signal 203 is replaced by the second waveform-coded signal 202 it is not necessary to adjust the spectral envelope levels to compensate for the interleaving of the frequency extended signal 203 and the second waveform-coded signal 202.

The high frequency reconstruction stage 120 preferably operates with a sampling rate which equals the sampling rate of the underlying core encoder that was used to encode the first wave-form coded signal 201. In this way, the same overlapping windowed transform, such as the same MDCT, may be used to code the second waveform-coded signal 202 as was used to code the first waveform-coded signal 202.

The interleaving stage 130 may further be configured to receive the first waveform-coded signal 201 from the receiving stage, preferably via the waveform decoding stage 240, the QMF analysis stage 250, and the delay stage 260, and to combine the interleaved signal 204 with the first waveform-coded signal 201 in order to generate a combined signal 205 having a spectral content for frequencies below as well as above the first cross-over frequency.

The output signal from the interleaving stage 130, i.e. the interleaved signal 204 or the combined signal 205, may subsequently, by a QMF synthesis stage 270, be transformed back to the time domain.

Figure 4:
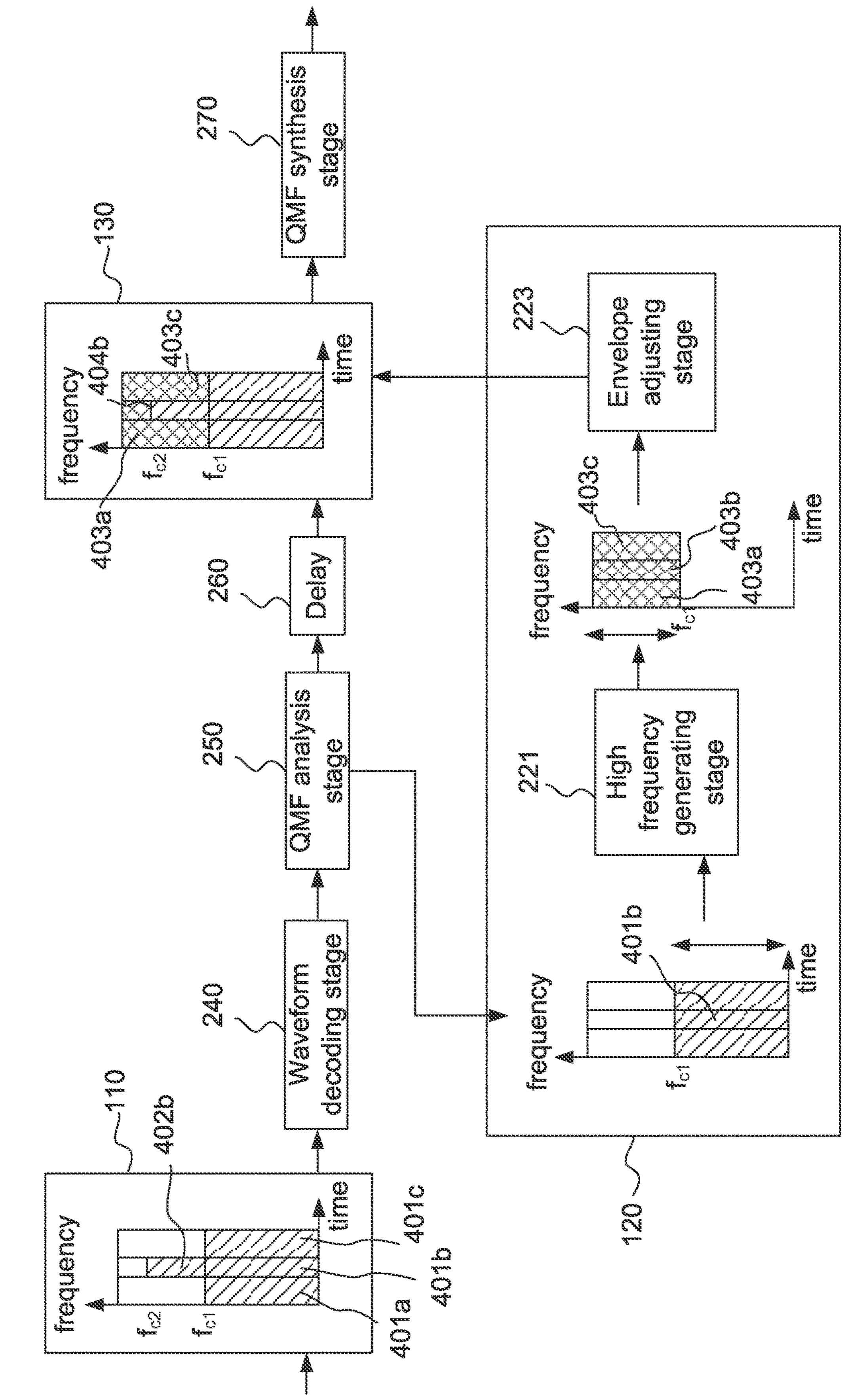
FIG. 4 is a schematic drawing of a decoder according to example embodiments.

Preferably, the QMF analysis stage 250 and the QMF synthesis stage 270 have the same number of sub-bands, meaning that the sampling rate of the signal being input to the QMF analysis stage 250 is equal to the sampling rate of the signal being output of the QMF synthesis stage 270. As a consequence, the waveform-coder (using MDCT) that was used to waveform-code the first and the second waveform-coded signals may operate on the same sampling rate as the output signal. Thus the first and the second waveform-coded signal can efficiently and structurally easily be coded by using the same MDCT transform. This is opposed to prior art where the sampling rate of the waveform coder typically was limited to half of that of the output signal, and the subsequent high frequency reconstruction module did an up-sampling as well as a high frequency reconstruction. This limits the ability to waveform code frequencies covering the entire output frequency range. FIG. 4 illustrates an exemplary embodiment of a decoder 400. The decoder 400 is intended to give an improved signal reconstruction for high frequencies in the case where there are transients in the input audio signal to be reconstructed. The main difference between the example of FIG. 4 and that of FIG. 2 is the form of the spectral content and the duration of the second waveform-coded signal.

FIG. 4 illustrates the operation of the decoder 400 during a plurality of subsequent time portions of a time frame; here three subsequent time portions are shown. A time frame may for example correspond to 2048 time samples. Specifically, during a first time portion, the receiving stage 110 receives a first waveform-coded signal 401*a* having a spectral content up to a first cross-over frequency $f_{c1}$. No second waveform-coded signal is received during the first time portion.

During the second time portion the receiving stage 110 receives a first waveform-coded signal 401*b* having a spectral content up to the first cross-over frequency $f_{c1}$, and a second waveform-coded signal 402*b* having a spectral content which corresponds to a subset of the frequency range above the first cross-over frequency $f_{c1}$. In the illustrated example of FIG. 4, the second waveform-coded signal 402*b* has a spectral content corresponding to a frequency interval extending between the first cross-over frequency $f_{c1}$ and a second cross-over frequency $f_{c2}$. The second waveform-coded signal 402*b* is thus a band-limited signal being limited to the frequency band between the first cross-over frequency $f_{c1}$ and the second cross-over frequency $f_{c2}$.

During the third time portion the receiving stage 110 receives a first waveform-coded signal 401*c* having a spectral content up to the first cross-over frequency $f_{c1}$. No second waveform-coded signal is received for the third time portion.

For the first and the third illustrated time portions there are no second waveform-coded signals. For these time portions the decoder will operate according to a conventional decoder configured to perform high frequency reconstruction, such as a conventional SBR decoder. The high frequency reconstruction stage 120 will generate frequency extended signals 403*a* and 403*c* based on the first waveform-coded signals 401*a* and 401*c*, respectively. However, since there are no second waveform-coded signals, no interleaving will be carried out by the interleaving stage 130.

For the second illustrated time portion there is a second waveform-coded signal 402*b*. For the second time portion the decoder 400 will operate in the same manner as described with respect to FIG. 2. In particularly, the high frequency reconstruction stage 120 performs high frequency reconstruction based on the first waveform-coded signal and the high frequency reconstruction parameters so as to generate a frequency extended signal 403*b*. The frequency extended signal 403*b* is subsequently input to the interleaving stage 130 where it is interleaved with the second waveform-coded signal 402*b* into an interleaved signal 404*b*. As discussed in connection to the example embodiment of FIG. 2, the interleaving may be performed by using an adding or a replacing approach.

In the example above, there is no second waveform-coded signal for the first and the third time portions. For these time portions the second cross-over frequency is equal to the first cross-over frequency, and no interleaving is performed. For the second time frame the second cross-over frequency is larger than the first cross-over frequency, and interleaving is performed. Generally, the second cross-over frequency may thus vary as a function of time. Particularly, the second cross-over frequency may vary within a time frame. Interleaving will be carried out when the second cross-over frequency is larger than the first cross-over frequency and smaller than a maximum frequency represented by the decoder. The case where the second cross-over frequency equals the maximum frequency corresponds to pure waveform coding and no high frequency reconstruction is needed.

Figure 7:
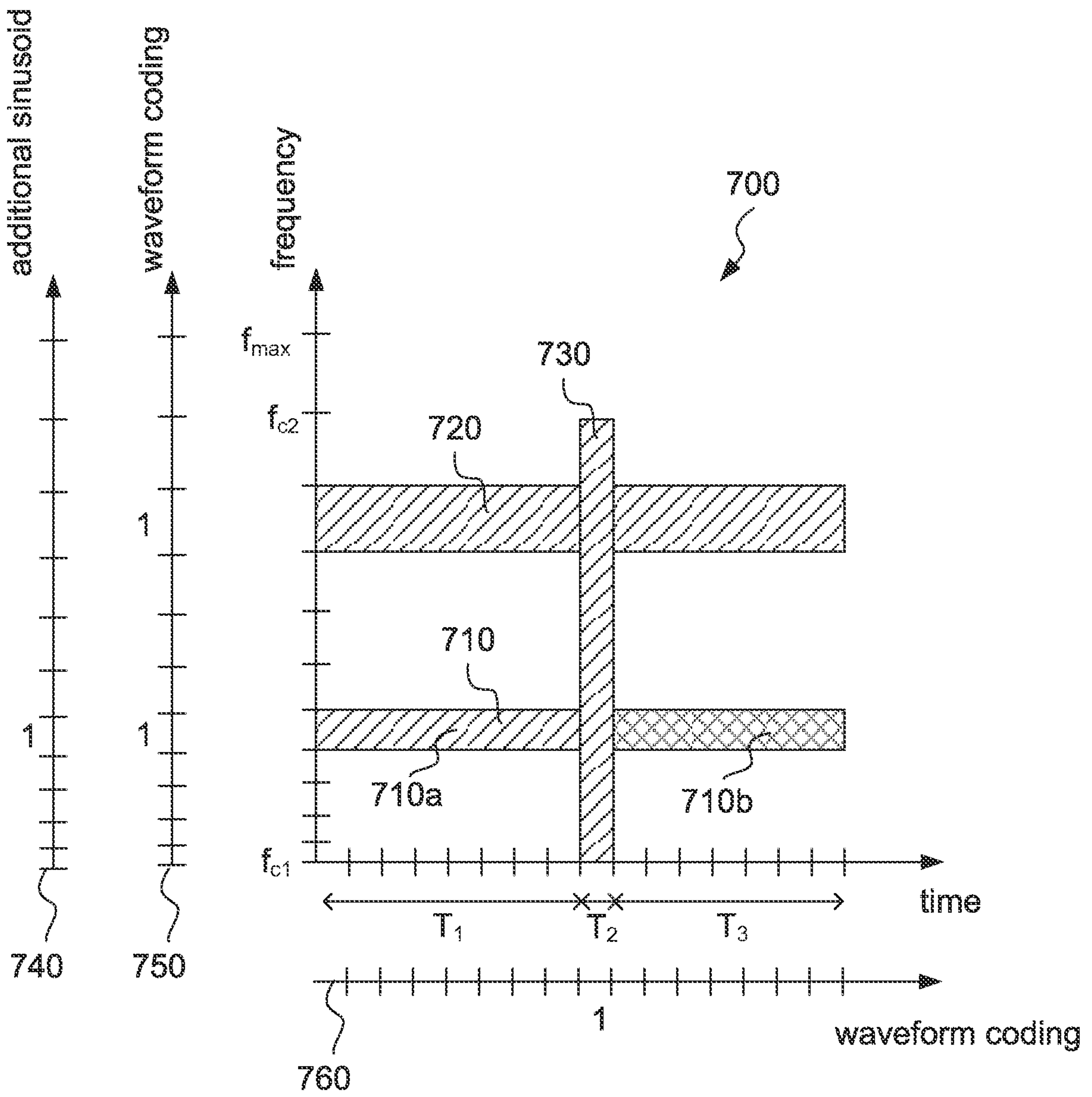
FIG. 7 is a schematic illustration of a signalling scheme according to example embodiments.

It is to be noted that the embodiments described with respect to FIGS. 2 and 4 may be combined. FIG. 7 illustrates a time frequency matrix 700 defined with respect to the frequency domain, preferably the QMF domain, in which the interleaving is performed by the interleaving stage 130. The illustrated time frequency matrix 700 corresponds to one frame of an audio signal to be decoded. The illustrated matrix 700 is divided into 16 time slots and a plurality of frequency sub-bands starting from the first cross-over frequency $f_{c1}$. Further a first time range $T_1$ covering the time range below the eighth time slot, a second time range $T_2$ covering the eighth time slot, and a time range $T_3$ covering the time slots above the eighth time slot are shown. Different spectral envelopes, as part of the SBR data, may be associated with the different time ranges $T_1$ to $T_3$.

In the present example, two strong tonal components in frequency bands 710 and 720 have been identified in the audio signal on the encoder side. The frequency bands 710 and 720 may be of the same bandwidth as e.g. SBR envelope bands, i.e. the same frequency resolution as is used for representing the spectral envelope. These tonal components in bands 710 and 720 have a time range corresponding to the full time frame, i.e. the time range of the tonal components includes the time ranges $T_1$ to $T_3$. On an encoder side, it has been decided to waveform-code the tonal components of 710 and 720 during the first time range $T_1$, illustrated by the tonal component 710*a* and 720 being dashed during the first time range $T_1$. Further it has been decided on an encoder side that during the second and third time ranges $T_2$ and $T_3$, the first tonal component 710 is to be parametrically reconstructed in the decoder by including a sinusoid as explained in connection to the parametric high frequency components stage 222 of FIG. 2. This is illustrated by the squared pattern of the first tonal component 710*b* during (the second time range $T_2$) and the third time range $T_3$. During the second and third time ranges $T_2$ and $T_3$, the second tonal component 720 is still waveform-coded. Further, in this embodiment, the first and second tonal components are to be interleaved with the high frequency reconstructed audio signal by means of addition, and therefore the encoder has adjusted the transmitted spectral envelope, the SBR envelope, accordingly.

Additionally, a transient 730 has been identified in the audio signal on the encoder side. The transient 730 has a time duration corresponding to the second time range $T_2$, and corresponds to a frequency interval between the first cross-over frequency $f_{c1}$ and a second cross-over frequency $f_{c2}$. On an encoder side it has been decided to waveform-code the time-frequency portion of the audio signal corresponding to the location of the transient. In this embodiment the interleaving of the waveform-coded transient is done by replacement.

A signalling scheme is set up to signal this information to the decoder. The signalling scheme comprises information relating to in which time ranges and/or in which frequency ranges above the first cross-over frequency $f_{c1}$ a second waveform-coded signal are available. The signalling scheme may also be associated with rules relating to how the interleaving is to be performed, i.e. if the interleaving is by means of addition or replacement. The signalling scheme may also be associated with rules defining the order of priority of adding or replacing the different signals as will be explained below.

The signalling scheme includes a first vector 740, labelled "additional sinusoid", indicating for each frequency sub-band if a sinusoid should be parametrically added or not. In FIG. 7, the addition of the first tonal component 710*b* in the second and third time ranges $T_2$ and $T_3$ is indicated by a "1" for the corresponding sub-band of the first vector 740. Signalling including the first vector 740 is known from prior art. There are rules defined in the prior art decoder for when a sinusoid is allowed to start. The rule is that if a new sinuoid is detected, i.e. the "additional sinusoid" signaling of the first vector 740 goes from zero in one frame to one the next frame, for a specific subband, then the sinusoid starts at the beginning of the frame unless there is a transient event in the frame, for which the sinusoid starts at the transient. In the illustrated example, there is a transient event 730 in the frame explaining why the parametrically reconstruction by means of a sinusoidal for the frequency band 710 only starts after the transient event 730.

The signalling scheme further includes a second vector 750, labelled "waveform coding". The second vector 750 indicates for each frequency sub-band if a waveform-coded signal is available for interleaving with a high frequency reconstruction of the audio signal. In FIG. 7, the availability of a waveform-coded signal for the first and the second tonal component 710 and 720 is indicated by a "1" for the corresponding sub-band of the second vector 750. In the present example, the indication of availability of waveform-coded data in the second vector 750 is also an indication that the interleaving is to be performed by way of addition. However, in other embodiments the indication of availability of waveform-coded data in the second vector 750 may be an indication that the interleaving is to be performed by way of replacement.

The signalling scheme further includes a third vector 760, labelled “waveform coding”. The third vector 760 indicates for each time slot if a waveform-coded signal is available for interleaving with a high frequency reconstruction of the audio signal. In FIG. 7, the availability of a waveform-coded signal for the transient 730 is indicated by a “1” for the corresponding time slot of the third vector 760. In the present example, the indication of availability of waveform-coded data in the third vector 760 is also an indication that the interleaving is to be performed by way of replacement. However, in other embodiments the indication of availability of waveform-coded data in the third vector 760 may be an indication that the interleaving is to be performed by way of addition.

There are many alternatives for how to embody the first, the second and the third vector 740, 750, 760. In some embodiments, the vectors 740, 750, 760 are binary vectors which use a logic zero or a logic one to provide their indications. In other embodiments, the vectors 740, 750, 760 may take different forms. For example, a first value such as “0” in the vector may indicate that no waveform-coded data is available for the specific frequency band or time slot. A second value such as “1” in the vector may indicate that interleaving is to be performed by way of addition for the specific frequency band or time slot. A third value such as “2” in the vector may indicate that interleaving is to be performed by way of replacement for the specific frequency band or time slot.

The above exemplary signalling scheme may also be associated with an order of priority which may be applied in case of conflict. By way of example, the third vector 760, representing interleaving of a transient by way of replacement may take precedence over the first and second vectors 740 and 750. Further, the first vector 740 may take precedence over the second vector 750. It is understood that any order of priority between the vectors 740, 750, 760 may be defined.

Figure 8A:
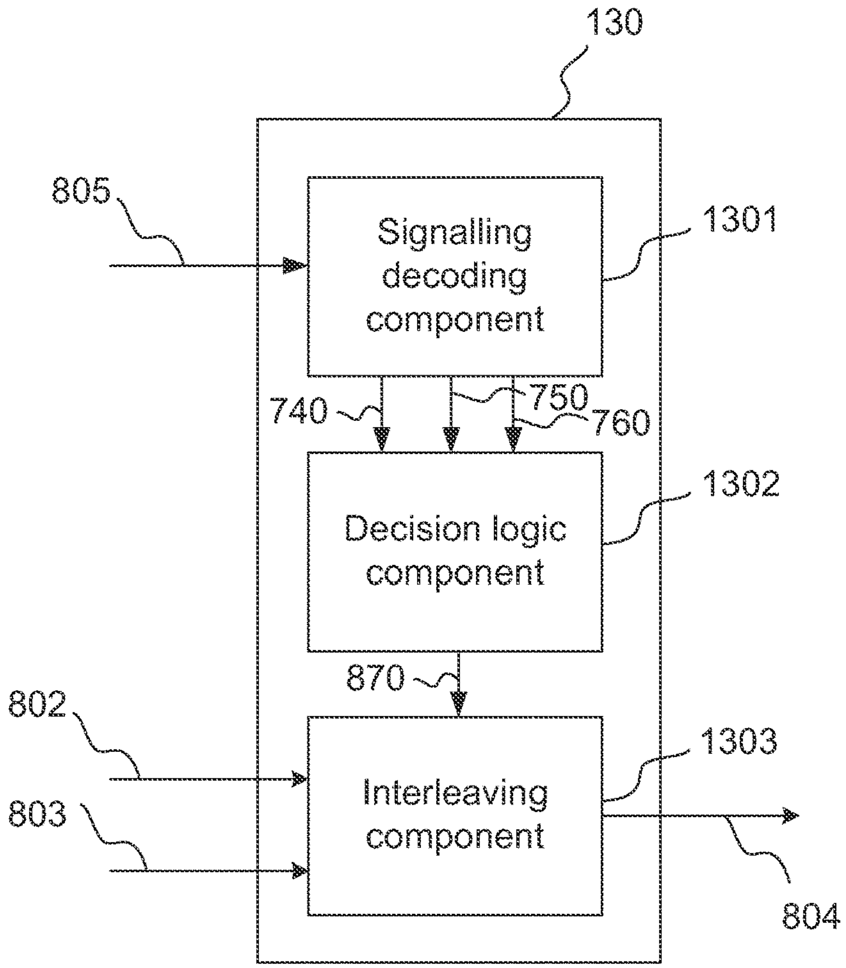
FIGS. 8*a-b* is a schematic illustration of an interleaving stage according to example embodiments.

FIG. 8*a* illustrates the interleaving stage 130 of FIG. 1 in more detail. The interleaving stage 130 may comprise a signalling decoding component 1301, a decision logic component 1302 and an interleaving component 1303. As discussed above, the interleaving stage 130 receives a second waveform-coded signal 802 and a frequency extended signal 803. The interleaving stage 130 may also receive a control signal 805. The signalling decoding component 1301 decodes the control signal 805 into three parts corresponding to the first vector 740, the second vector 750, and the third vector 760 of the signalling scheme described with respect to FIG. 7. These are sent to the decision logic component 1302 which based on logic creates a time/frequency matrix 870 for the QMF frame indicating which of the second waveform-coded signal 802 and the frequency extended signal 803 to use for which time/frequency tile. The time/frequency matrix 870 is sent to the interleave component 1303 and is used when interleaving the second waveform-coded signal 802 with the frequency extended signal 803.

Figure 8B:
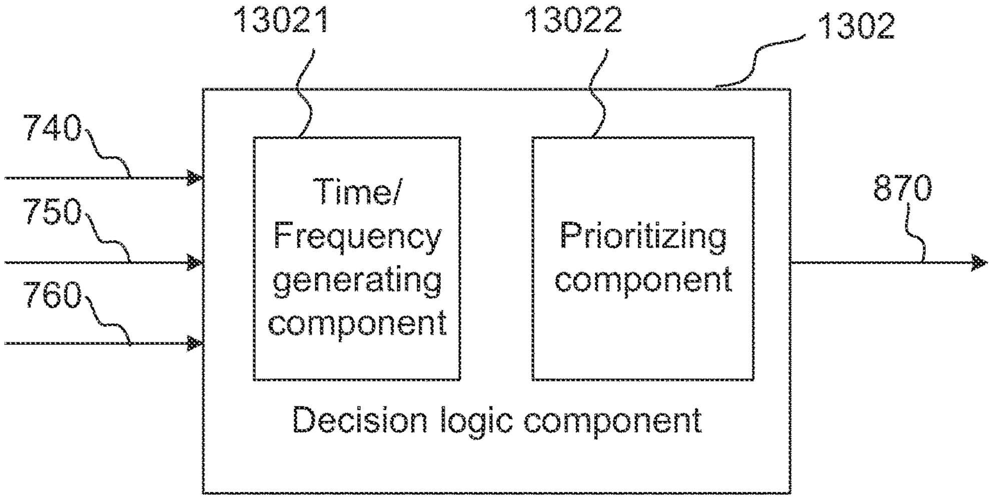

The decision logic component 1302 is shown in more detail in FIG. 8*b*. The decision logic components 1302 may comprise a time/frequency matrix generating component 13021 and a prioritizing component 13022. The time/frequency generating component 13021 generates a time/frequency matrix 870 having time/frequency tiles corresponding to the current QMF frame. The time/frequency generating component 13021 includes information from the first vector 740, the second vector 750 and the third vector 760 into the time/frequency matrix. For example, as illustrated in FIG. 7, if there is a “1” (or more generally any number different from zero) in the second vector 750 for a certain frequency, the time/frequency tiles corresponding to the certain frequency are set to “1” (or more generally to the number present in the vector 750) in the time/frequency matrix 870 indicating that interleaving with the second waveform-coded signal 802 is to be performed for those time/frequency tiles. Similarly, if there is a “1” (or more generally any number different from zero) in the third vector 760 for a certain time slot, the time/frequency tiles corresponding to the certain time slot are set to “1” (or more generally any number different from zero) in the time/frequency matrix 870 indicating that interleaving with the second waveform-coded signal 802 is to be performed for those time/frequency tiles. Likewise, if there is a “1” in the first vector 740 for a certain frequency, the time/frequency tiles corresponding to the certain frequency are set to “1” in the time/frequency matrix 870 indicating that the output signal 804 is to be based on the frequency extended signal 803 in which the certain frequency has been parametrically reconstructed, e.g. by inclusion of a sinusoidal signal.

For some time/frequency tiles there will be a conflict between the information from the first vector 740, the second vector 750 and the third vector 760, meaning that more than one of the vectors 740-760 indicates a number different from zero, such as a “1”, for the same time/frequency tile of the time/frequency matrix 870. In such situation, the prioritizing component 13022 needs to make a decision on how to prioritize the information from the vectors in order to remove the conflicts in the time/frequency matrix 870. More precisely, the prioritizing component 13022 decides whether the output signal 804 is to be based on the frequency extended signal 803 (thereby giving priority to the first vector 740), by interleaving of the second wave-form coded signal 802 in a frequency direction (thereby giving priority to the second vector 750), or by interleaving of the second wave-form coded signal 802 in a time direction (thereby giving priority to the third vector 750).

For this purpose the prioritizing component 13022 comprises predefined rules relating to an order of priority of the vectors 740-760. The prioritizing component 13022 may also comprise predefined rules relating to how the interleaving is to be performed, i.e. if the interleaving is to be performed by way of addition or replacement.

Preferably, these rules are as follows:

Interleaving in the time direction, i.e. interleaving as defined by the third vector 760, is given the highest priority. Interleaving in the time direction is preferably performed by replacing the frequency extended signal 803 in those time/frequency tiles defined by the third vector 760. The time resolution of the third vector 760 corresponds to a time slot of the QMF frame. If the QMF frame corresponds to 2048 time-domain samples, a time slot may typically correspond to 128 time-domain samples.

Parametric reconstruction of frequencies, i.e. using the frequency extended signal 803 as defined by the first vector 740 is given the second highest priority. The frequency resolution of the first vector 740 is the frequency resolution of the QMF frame, such as a SBR envelope band. The prior art rules relating to the signalling and interpretation of the first vector 740 remain valid.

Interleaving in the frequency direction, i.e. interleaving as defined by the second vector 750, is given the lowest order of priority. Interleaving in the frequency direction is performed by adding the frequency extended signal 803 in those time/frequency tiles defined by the second vector 750. The frequency resolution of the second vector 750 corresponds to the frequency resolution of the QMF frame, such as a SBR envelope band.

III. Example Embodiments—Encoder

Figure 5:
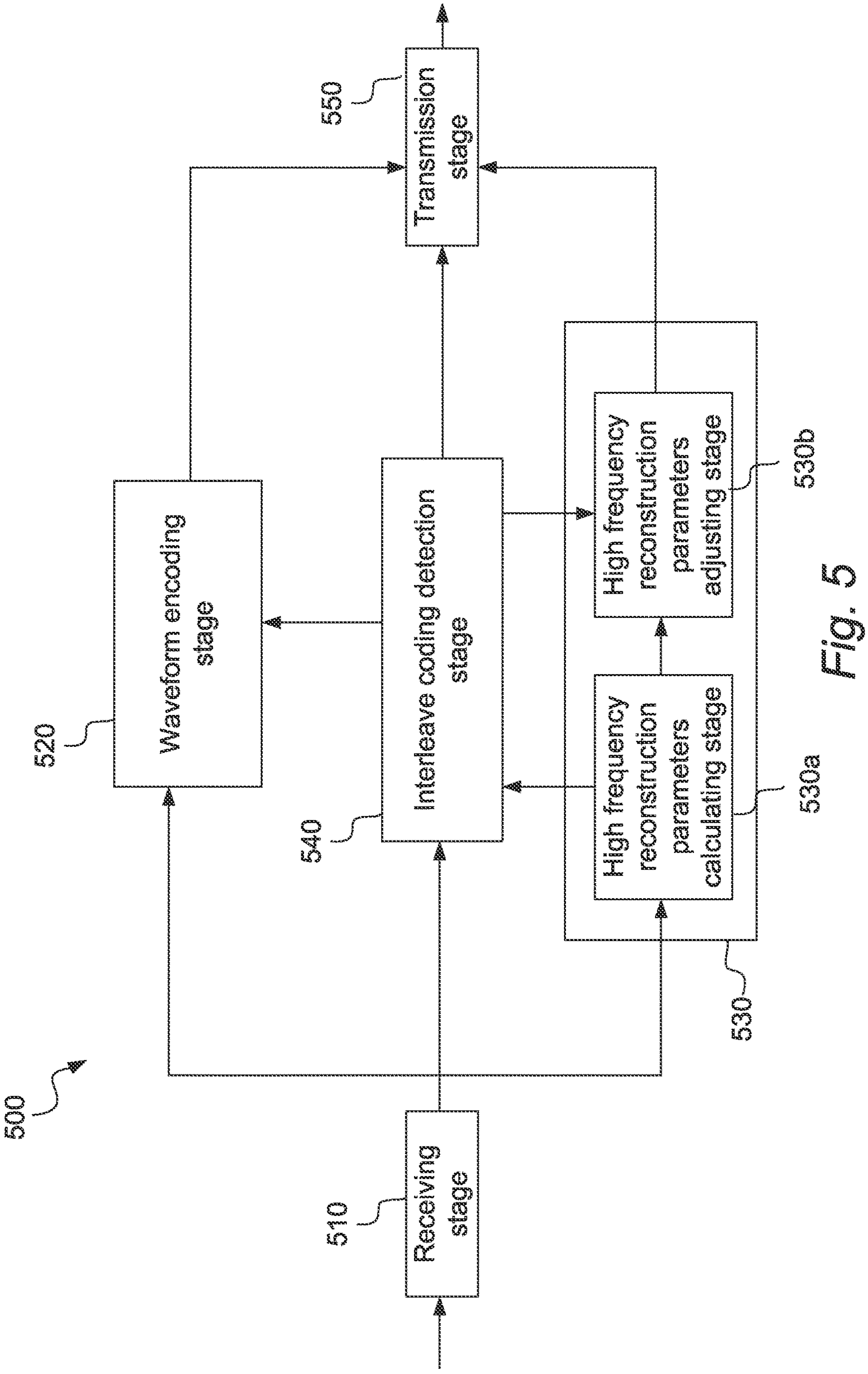
FIG. 5 is a schematic drawing of an encoder according to example embodiments.

FIG. 5 illustrates an exemplary embodiment of an encoder 500 which is suitable for use in an audio processing system. The encoder 500 comprises a receiving stage 510, a waveform encoding stage 520, a high frequency encoding stage 530, an interleave coding detection stage 540, and a transmission stage 550. The high frequency encoding stage 530 may comprise a high frequency reconstruction parameters calculating stage 530*a* and a high frequency reconstruction parameters adjusting stage 530*b*.

Figure 6:
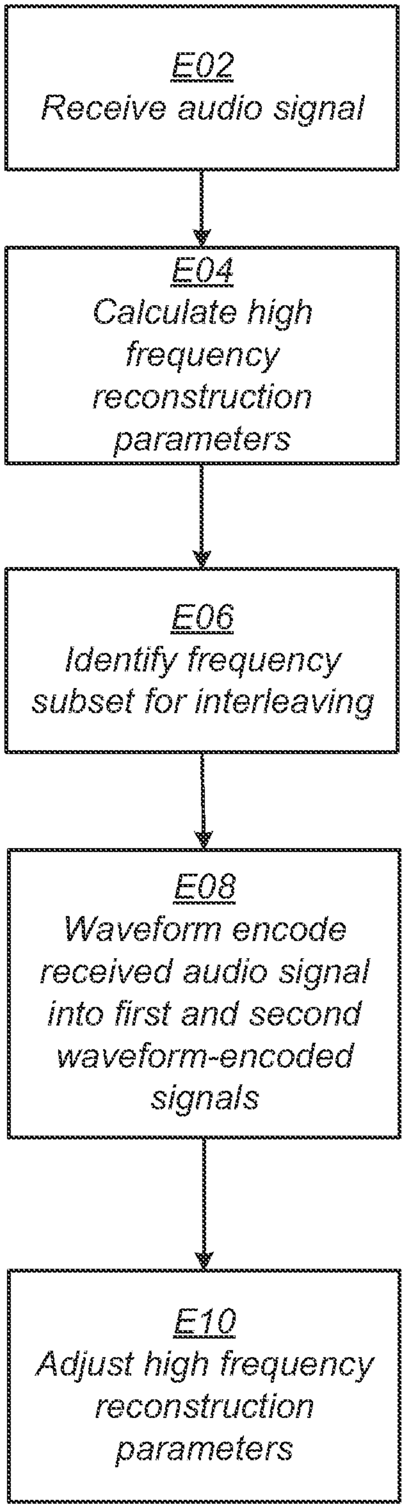
FIG. 6 is a flow chart of an encoding method according to example embodiments.

The operation of the encoder 500 will be described in the following with reference to FIG. 5 and the flowchart of FIG. 6. In step E02, the receiving stage 510 receives an audio signal to be encoded.

The received audio signal is input to the high frequency encoding stage 530. Based on the received audio signal, the high frequency encoding stage 530, and in particular the high frequency reconstruction parameters calculating stage 530*a*, calculates in step E04 high frequency reconstruction parameters enabling high frequency reconstruction of the received audio signal above the first cross-over frequency $f_c$. The high frequency reconstruction parameters calculating stage 530*a* may use any known technique for calculating the high frequency reconstruction parameters, such as SBR encoding. The high frequency encoding stage 530 typically operates in a QMF domain. Thus, prior to calculating the high frequency reconstruction parameters, the high frequency encoding stage 530 may perform QMF analysis of the received audio signal. As a result, the high frequency reconstruction parameters are defined with respect to a QMF domain.

The calculated high frequency reconstruction parameters may comprise a number of parameters relating to high frequency reconstruction. For example, the high frequency reconstruction parameters may comprise parameters relating to how to mirror or copy the audio signal from sub-band portions of the frequency range below the first cross-over frequency $f_c$ to sub-band portions of the frequency range above the first cross-over frequency $f_c$. Such parameters are sometimes referred to as parameters describing the patching structure.

The high frequency reconstruction parameters may further comprise spectral envelope parameters describing the target energy levels of sub-band portions of the frequency range above the first cross-over frequency.

The high frequency reconstruction parameters may further comprise missing harmonics parameters indicating harmonics, or strong tonal components that will be missing if the audio signal is reconstructed in the frequency range above the first cross-over frequency using the parameters describing the patching structure.

The interleave coding detection stage 540 then, in step E06, identifies a subset of the frequency range above the first cross-over frequency $f_c$ for which the spectral content of the received audio signal is to be waveform-coded. In other words, the role of the interleave coding detection stage 540 is to identify frequencies above the first cross-over frequency for which the high frequency reconstruction does not give a desirable result.

The interleave coding detection stage 540 may take different approaches to identify a relevant subset of the frequency range above the first cross-over frequency $f_c$. For example, the interleave coding detection stage 540 may identify strong tonal components which will not be well reconstructed by the high frequency reconstruction. Identification of strong tonal components may be based on the received audio signal, for example, by determining the energy of the audio signal as a function of frequency and identifying the frequencies having a high energy as comprising strong tonal components. Further, the identification may be based on knowledge about how the received audio signal will be reconstructed in the decoder. In particular, such identification may be based on tonality quotas being the ratio of a tonality measure of the received audio signal and the tonality measure of a reconstruction of the received audio signal for frequency bands above the first cross-over frequency. A high tonality quota indicates that the audio signal will not be well reconstructed for the frequency corresponding to the tonality quota.

The interleave coding detection stage 540 may also detect transients in the received audio signal which will not be well reconstructed by the high frequency reconstruction. Such identification may be the result of a time-frequency analysis of the received audio signal. For example, a time-frequency interval where a transient occurs may be detected from a spectrogram of the received audio signal. Such time-frequency interval typically has a time range which is shorter than a time frame of the received audio signal. The corresponding frequency range typically corresponds to a frequency interval which extends to a second cross-over frequency. The subset of the frequency range above the first cross-over frequency may therefore be identified by the interleave coding detection stage 540 as an interval extending from the first cross-over frequency to a second cross-over frequency.

The interleave coding detection stage 540 may further receive high frequency reconstruction parameters from the high frequency reconstruction parameters calculating stage 530*a*. Based on the missing harmonics parameters from the high frequency reconstruction parameters, the interleave coding detection stage 540 may identify frequencies of missing harmonics and decide to include at least some of the frequencies of the missing harmonics in the identified subset of the frequency range above the first cross-over frequency $f_c$. Such an approach may be advantageous if there are strong tonal component in the audio signal which cannot be correctly modelled within the limits of the parametric model.

The received audio signal is also input to the waveform encoding stage 520. The waveform encoding stage 520, in step E08, performs waveform encoding of the received audio signal. In particular, the waveform encoding stage 520 generates a first waveform-coded signal by waveform-coding the audio signal for spectral bands up to the first cross-over frequency $f_c$. Further, the waveform encoding stage 520 receives the identified subset from the interleave coding detection stage 540. The waveform encoding stage 520 then generates a second waveform-coded signal by waveform-coding the received audio signal for spectral bands corresponding to the identified subset of the frequency range above the first cross-over frequency. The second waveform-coded signal will hence have a spectral content corresponding to the identified subset of the frequency range above the first cross-over frequency $f_c$.

According to example embodiments, the waveform encoding stage 520 may generate the first and the second waveform-coded signals by first waveform-coding the received audio signal for all spectral bands and then, remove the spectral content of the so waveform-coded signal for frequencies corresponding to the identified subset of frequencies above the first cross-over frequency $f_c$.

The waveform encoding stage may for example perform waveform coding using an overlapping windowed transform filter bank, such as a MDCT filter bank. Such overlapping windowed transform filter banks use windows having a certain temporal length, causing the values of the transformed signal in one time frame to be influenced by values of the signal in the previous and the following time frame. In order to reduce the effect of this fact it may be advantageous to perform a certain amount of temporal over-coding, meaning that the waveform-coding stage 520 not only waveform-codes the current time frame of the received audio signal but also the previous and the following time frame of the received audio signal. Similarly, also the high frequency encoding stage 530 may encode not only the current time frame of the received audio signal but also the previous and the following time frame of the received audio signal. In this way, an improved cross-fade between the second waveform-coded signal and a high frequency reconstruction of the audio signal can be achieved in the QMF domain. Further, this reduces the need for adjustment of the spectral envelope data borders.

It is to be noted that the first and the second waveform-coded signals may be separate signals. However, preferably they form first and second waveform-coded signal portions of a common signal. If so, they may be generated by performing a single waveform-encoding operation on the received audio signal, such as applying a single MDCT transform to the received audio signal.

The high frequency encoding stage 530, and in particular the high frequency reconstruction parameters adjusting stage 530*b*, may also receive the identified subset of the frequency range above the first cross-over frequency $f_c$. Based on the received data the high frequency reconstruction parameters adjusting stage 530*b* may in step E10 adjust the high frequency reconstruction parameters. In particular, the high frequency reconstruction parameters adjusting stage 530*b* may adjust the high frequency reconstruction parameters corresponding to spectral bands comprised in the identified subset.

For example, the high frequency reconstruction parameters adjusting stage 530*b* may adjust the spectral envelope parameters describing the target energy levels of sub-band portions of the frequency range above the first cross-over frequency. This is particularly relevant if the second waveform-coded signal is to be added with a high frequency reconstruction of the audio signal in a decoder, since then the energy of the second waveform-coded signal will be added to the energy of the high frequency reconstruction. In order to compensate for such addition, the high frequency reconstruction parameters adjusting stage 530*b* may adjust the energy envelope parameters by subtracting a measured energy of the second waveform-coded signal from the target energy levels for spectral bands corresponding to the identified subset of the frequency range above the first cross-over frequency $f_c$. In this way, the total signal energy will be preserved when the second waveform-coded signal and the high frequency reconstruction are added in the decoder. The energy of the second wave-form coded signal may for example be measured by the interleave coding detection stage 540.

The high frequency reconstruction parameters adjusting stage 530*b* may also adjust the missing harmonics parameters. More particularly, if a sub-band comprising a missing harmonics as indicated by the missing harmonics parameters is part of the identified subset of the frequency range above the first cross-over frequency $f_c$, that sub-band will be waveform coded by the waveform encoding stage 520. Thus, the high frequency reconstruction parameters adjusting stage 530*b* may remove such missing harmonics from the missing harmonics parameters, since such missing harmonics need not be parametrically reconstructed at the decoder side.

The transmission stage 550 then receives the first and the second waveform-coded signal from the waveform encoding stage 520 and the high frequency reconstruction parameters from the high frequency encoding stage 530. The transmission stage 550 formats the received data into a bit stream for transmission to a decoder.

The interleave coding detection stage 540 may further signal information to the transmission stage 550 for inclusion in the bit stream. In particular, the interleave coding detection stage 540 may signal how the second waveform-coded signal is to be interleaved with a high frequency reconstruction of the audio signal, such as whether the interleaving is to be performed by addition of the signals or by replacement of one of the signals with the other, and for what frequency range and what time interval the waveform coded signals should be interleaved. For example, the signalling may be carried out using the signalling scheme discussed with reference to FIG. 7.

EQUIVALENTS, EXTENSIONS, ALTERNATIVES AND MISCELLANEOUS

Further embodiments of the present disclosure will become apparent to a person skilled in the art after studying the description above. Even though the present description and drawings disclose embodiments and examples, the disclosure is not restricted to these specific examples. Numerous modifications and variations can be made without departing from the scope of the present disclosure, which is defined by the accompanying claims. Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A method for decoding an audio signal in an audio processing system, the method comprising:

receiving a first waveform-coded signal comprising spectral content up to a first cross-over frequency;

receiving a second waveform-coded signal comprising spectral content corresponding to a subset of a frequency range above the first cross-over frequency;

performing high frequency reconstruction using at least a portion of the first waveform-coded signal and high frequency reconstruction parameters so as to generate a frequency extended signal having spectral content above the first cross-over frequency, wherein the high frequency reconstruction comprises adjusting energy levels of subbands of the frequency extended signal based on a target energy levels for the subbands, wherein the high frequency reconstruction is performed in a frequency domain; and interleaving the frequency extended signal with the second waveform-coded signal to generate an interleaved signal, such that energy levels for subbands of the interleaved signal are based on the target energy levels for the subbands.

2. The method of claim 1, wherein the spectral content of the second waveform-coded signal overlaps the spectral content of the frequency extended signal in the subset of the frequency range above the first cross-over frequency.

3. The method of claim 1, wherein adjusting energy levels of subbands of the frequency extending signal comprises subtracting the energy levels of subbands of the frequency extending signal from the target energy levels for the subbands.

4. The method of claim 1, further comprising adjusting the spectral content of the frequency extended signal in accordance with the high frequency reconstruction parameters so as to adjust a spectral envelope of the frequency extended signal.

5. The method of claim 1, wherein the interleaving comprises replacing the spectral content of the frequency extended signal by the spectral content of the second waveform-coded signal in the subset of the frequency range above the first cross-over frequency which corresponds to the spectral content of the second waveform-coded signal.

6. A non-transitory computer-readable medium storing instructions that, when executed by a processor, cause the processor to perform the method of claim 1.

7. An apparatus for decoding an encoded audio signal, the apparatus comprising:

an input interface configured to receive a first waveform-coded signal comprising spectral content up to a first cross-over frequency, and a second waveform-coded signal comprising spectral content corresponding to a subset of a frequency range above the first cross-over frequency;

high frequency reconstructor configured to receive the first waveform-coded signal and high frequency reconstruction parameters and to perform high frequency reconstruction using the first waveform-coded signal and the high frequency reconstruction parameters so as to generate a frequency extended signal having spectral content above the first cross-over frequency, wherein the high frequency reconstruction comprises adjusting energy levels of subbands of the frequency extended signal based on target energy levels for the subbands, wherein the high frequency reconstruction is performed in a frequency domain; and an interleaver configured to receive the frequency extended signal from the high frequency reconstructor and the second waveform-coded signal from the input interface, and to interleave the frequency extended signal with the second waveform-coded signal to generate an interleaved signal, such that energy levels for subbands of the interleaved signal are based on the target energy levels.

* * * * *